Jan. 2, 1962    L. G. PENDER, SR    3,015,140
TUBING CLIP
Filed Feb. 27, 1959
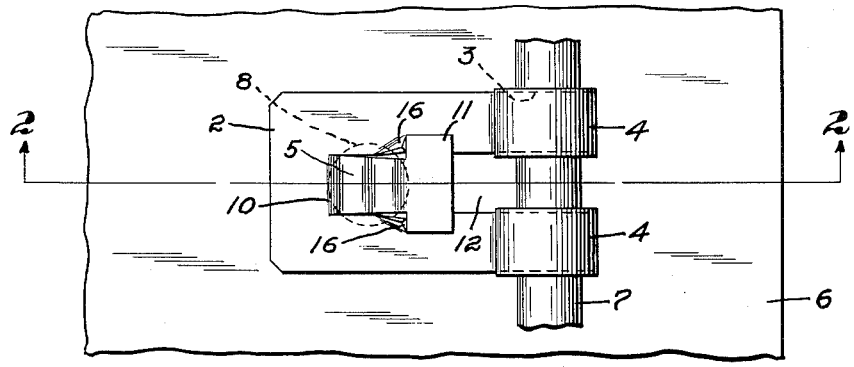
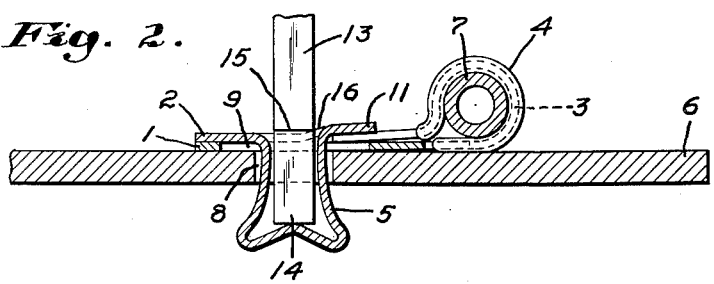
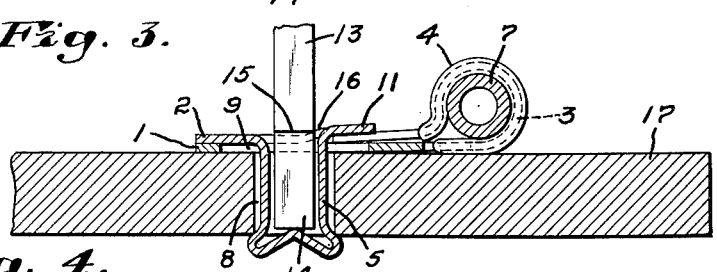
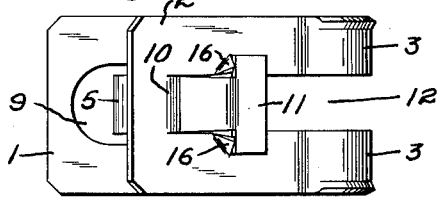
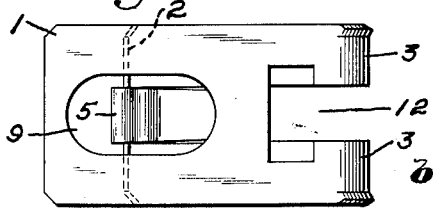
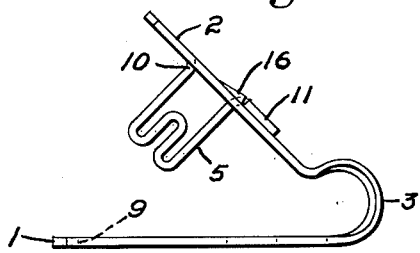
Inventor:
Lloyd G. Pender Sr.,
by Walter P. Jones
Att'y.

United States Patent Office 3,015,140
Patented Jan. 2, 1962

3,015,140
TUBING CLIP
Lloyd G. Pender, Sr., Detroit, Mich., assignor to United-Carr Fastener Corporation, Cambridge, Mass., a corporation of Delaware
Filed Feb. 27, 1959, Ser. No. 795,985
1 Claim. (Cl. 24—73)

My invention aims to provide an improved fastening device for attaching tubes, rods, wires and the like to a supporting structure.

An object of my invention is to provide a simple fastening device that may adapt itself to rigid attachment to a wide range of thicknesses of supporting materials and to various sizes of elements to be held in position upon a support.

Another object of the invention is to provide a fastening device formed from one piece of material and having a universal riveting means.

A further object of my invention is to provide a fastening device of the type referred to above and which has a cushioning means at the inner surface of the clamping portion to prevent cutting of a part or parts to be held.

Referring now to the devices illustrated by the drawings:

FIG. 1 is an enlarged plan view of an installation showing my improved fastening device attached to a support and holding a tubing in place;

FIG. 2 is a section taken on the line 2—2 of FIG. 1 with an end of a riveting tool included;

FIG. 3 is a section similar to FIG. 2 but showing the device attached to a substantially thicker support;

FIG. 4 is an enlarged top plan view of a fastening device as it appears before attachment to a support and with the cushioning means eliminated;

FIG. 5 is a bottom plan view of the device shown in FIG. 4; and

FIG. 6 is an edge view of the device shown in FIG. 4.

In the drawings, I have illustrated in FIGS. 4, 5 and 6 my improved fastening device as a plain one piece all metal part. In FIGS. 1, 2 and 3 I have shown the same device with a cushioning means assembled with the device at the clamping portion.

Referring now particularly to FIGS. 1, 2 and 3, I have shown a fastening device provided with a support engaging base portion 1, an attaching portion 2, a clamping portion 3, a cushioning means 4 and a rivet portion 5. The fastener is illustrated as attached to a support 6 and holds a portion of a tube 7 with a rivet passing through an aperture 8 in the support 6 and riveted in position, as illustrated in FIG. 2.

The normal position of the fastener portions are such that the support engaging base portion and the attaching portion are relatively V-shaped as shown in FIG. 6. To attach the device to a support the tube 7, or other part or parts to be attached to a support, is inserted laterally into the V-shape until the tube 7 is seated in the clamping portion 3. Then the device is placed in a position on a support over an aperture and the attaching portion is pressed toward the base portion. In the particular device illustrated, the base portion has an aperture or slot 9 and the rivet passes through this aperture or slot 9 through the aperture in the support.

The rivet 5 is preferably formed from a ribbon of stock taken from the attaching portion, clamping portion and base, as illustrated in FIGS. 4 and 5, and is formed into a W-like shaped portion (FIG. 5) and one end 10 is integral with the attaching portion 2 while the other end 11 is T-shaped and overlaps the attaching portion at opposite sides of a slot 12, as best shown in FIGS. 1 and 4.

When the fastener is attached to a support a simple driving tool 13 (FIGS. 2 and 3) is used and this has a reduced end portion 14 that engages the W-portion and, when driven to the shoulder 15 of the tool, has a tendency to flatten the center portion of the W and expand the leg portions, as shown in FIGS. 2 and 3.

In order to prevent the free T-shaped end portion 11 of the rivet from movement relative to the attaching portion 2 during the riveting operation, I have provided the attaching portion with bent up shouldered portions 16—16 as shown in FIGS. 1, 4 and 6. Thus, the T-shaped portion 11 abuts the shoulder portions 16—16 and cannot move.

My W-shaped rivet 5 is particularly useful because it permits attachment of the device to substantial variations in thicknesses of supporting materials. I have illustrated this in connection with a relatively thin support 6 in FIG. 2 and a substantially thicker support 7 in FIG. 3.

While the base portion 1 doesn't necessarily have to extend entirely to the free end of the attaching portion 2 as illustrated, I prefer to so construct the device that it does extend under the rivet so that the rivet passes through the hole or slot 9, thereby locking the parts to prevent substantial relative lateral movement.

While the cushioning means 4 shown in FIGS. 1, 2 and 3 is not necessary in the attachment of some articles, it is useful in connection with tubing and wiring to prevent cutting. The cushioning portions 4—4 may be provided by dipping, molding or assembling of separate pieces as desired.

The same tool 13 may be used to apply the fastener to various thicknesses of supports and in each instance is driven downwardly with the free end 14 entering the rivet until the shoulder 15 seats against the attaching portion. This insures proper attachment.

While I have illustrated and described preferred embodiments of my device, it should be understood that variations thereof are contemplated without departing from the scope of my invention which is best defined by the following claim.

I claim:

A fastening device of the class described comprising a support engaging apertured base portion, an attaching portion adapted to overlie said base portion and a clamping portion connecting the base and attaching portions and adapted to clamp around an object to be held in place on a support by said fastening device, a W-like shaped rivet portion integral at one end with the attaching portion and adapted to pass through the aperture in said base portion and through an aperture in a support and to be upset to attach the fastening device and clamp an object, said rivet portion being formed from material taken from the attaching portion and clamping portion and leaving a free end of a shape so that at least a portion of the free end overlaps the attaching portion to prevent the free end from passing through a slot in the clamping portion when the rivet portion is upset, and a shouldered portion formed from said attaching portion and lying adjacent to the overlapped portion of the free end of the rivet portion to prevent the free end from moving laterally to any substantial extent when said rivet portion is being upset.

References Cited in the file of this patent

UNITED STATES PATENTS

| 501,392 | Wiedenmann | July 11, 1893 |
| 2,128,004 | Lombard | Aug. 23, 1938 |
| 2,432,492 | Tinnerman | Dec. 9, 1947 |
| 2,658,247 | Heuer | Nov. 10, 1953 |
| 2,670,512 | Flora | Mar. 2, 1954 |
| 2,783,512 | Elms | Mar. 5, 1957 |